United States Patent Office 3,552,773
Patented Jan. 5, 1971

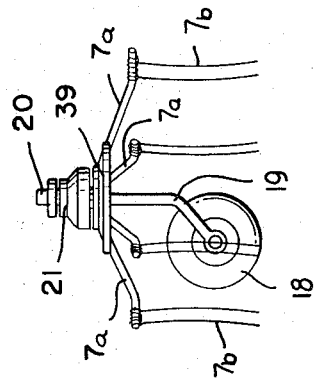
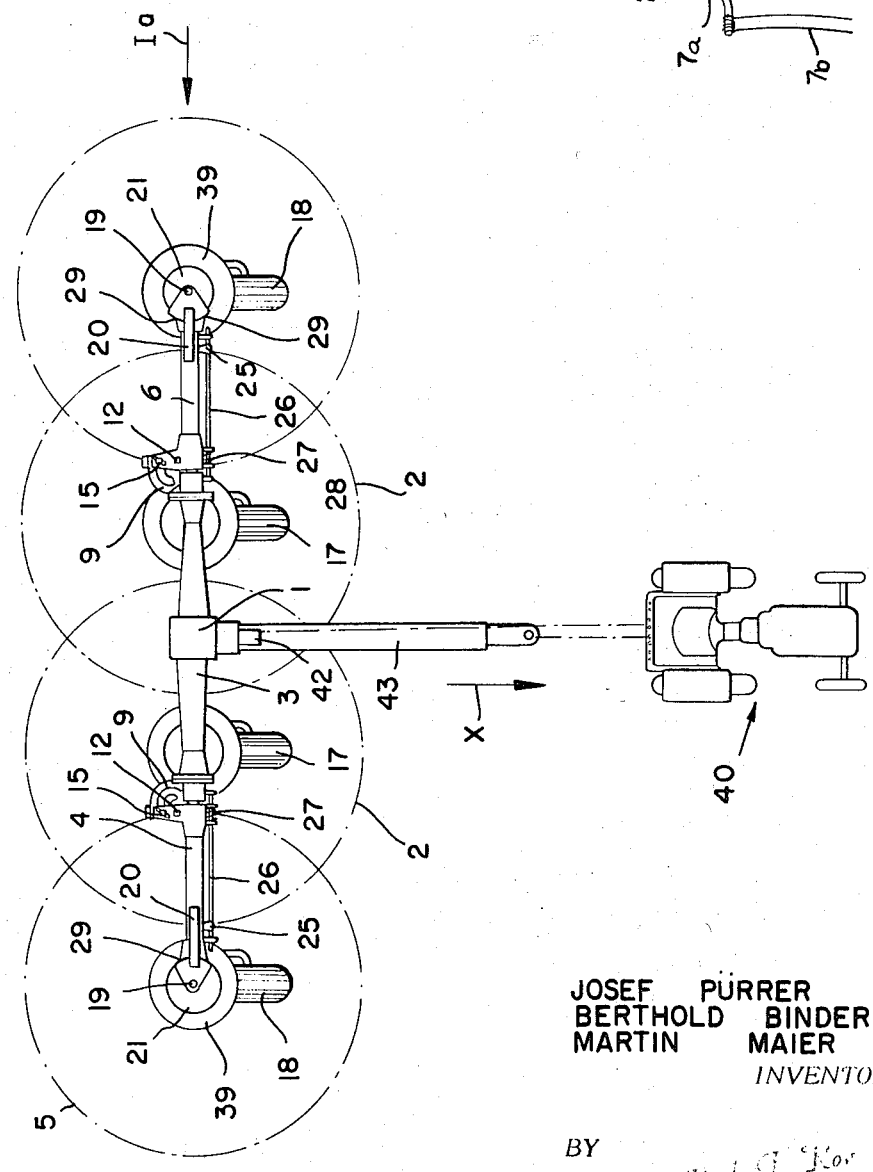

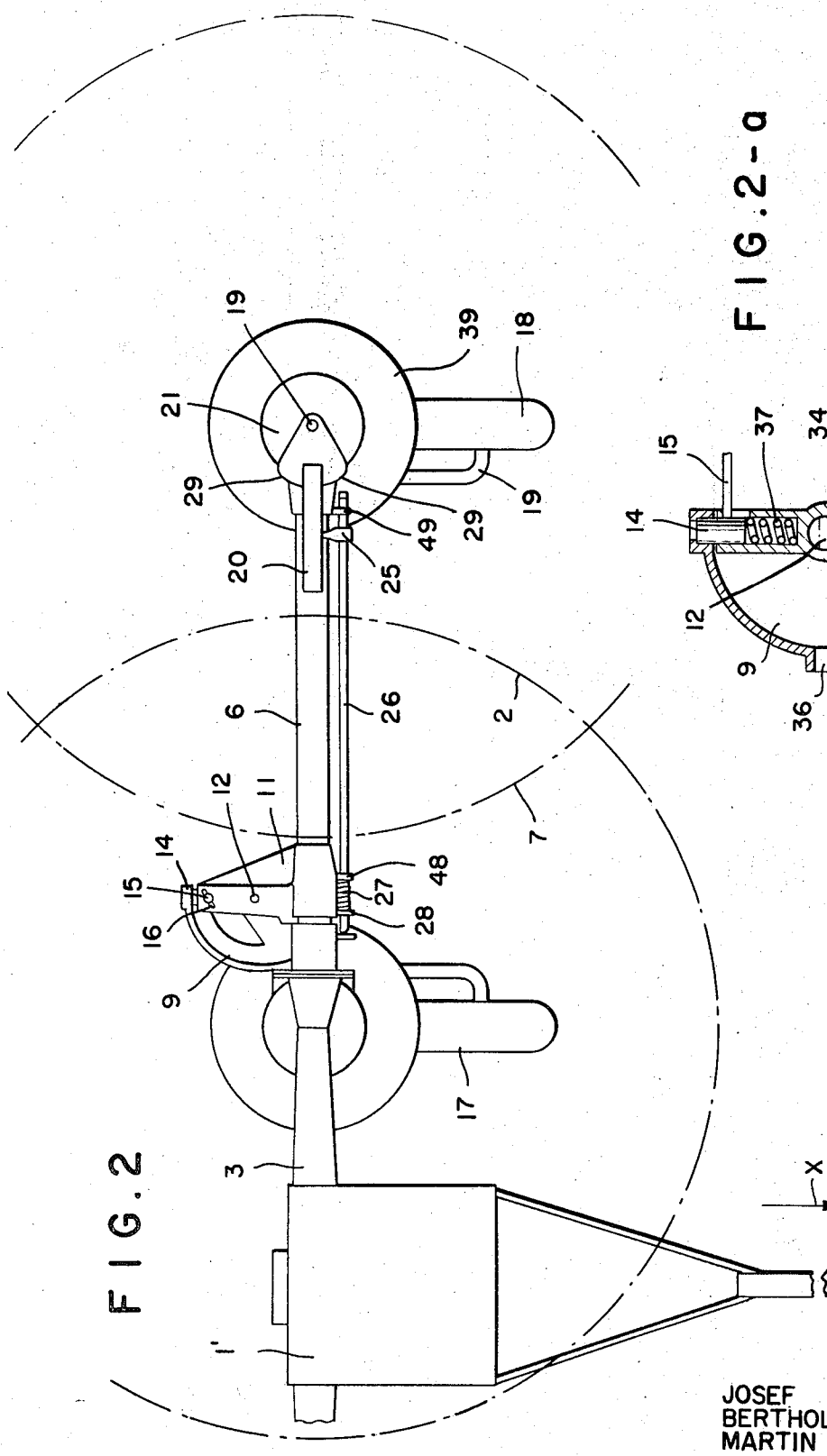
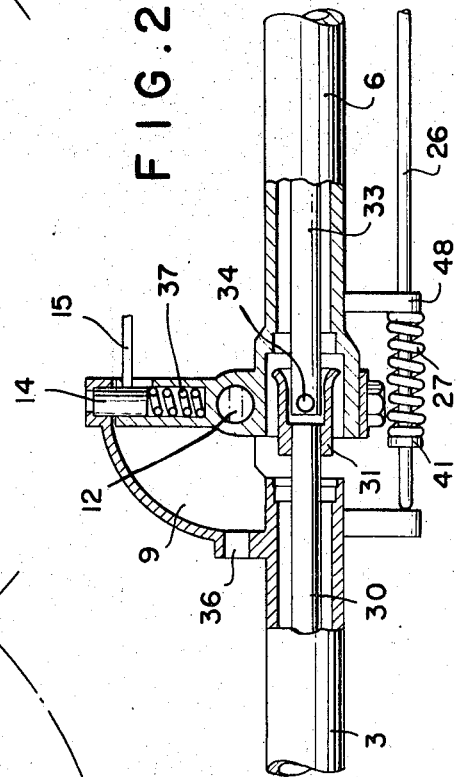

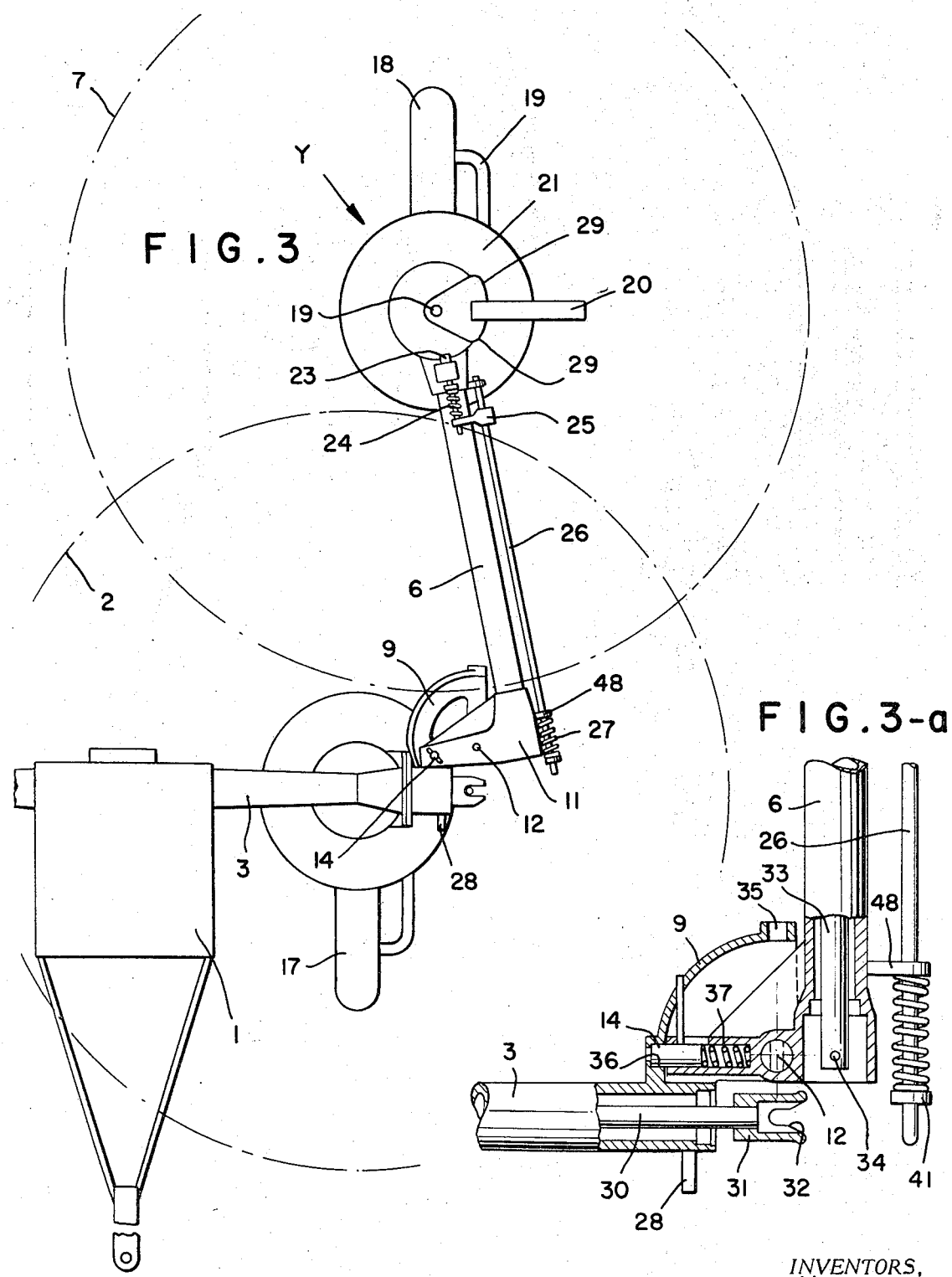

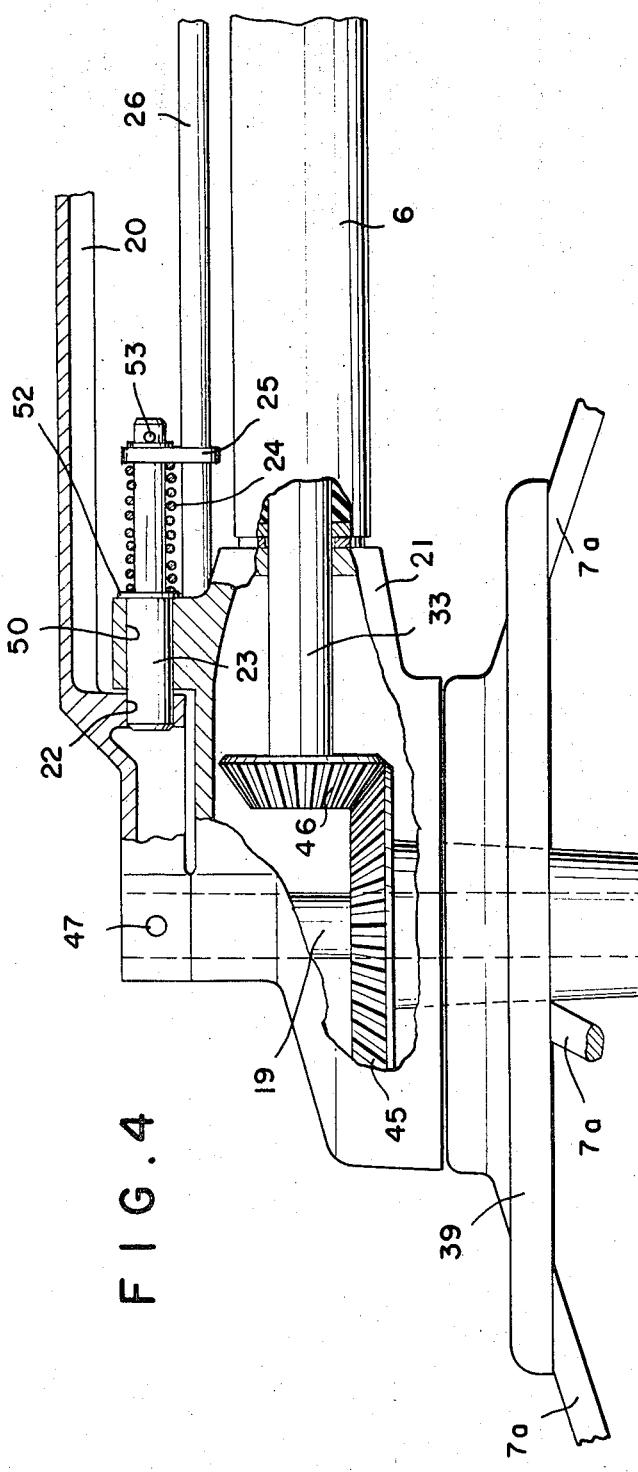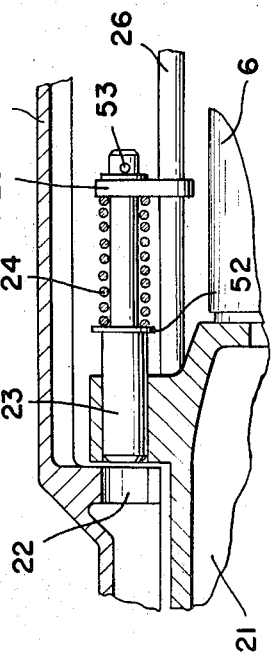

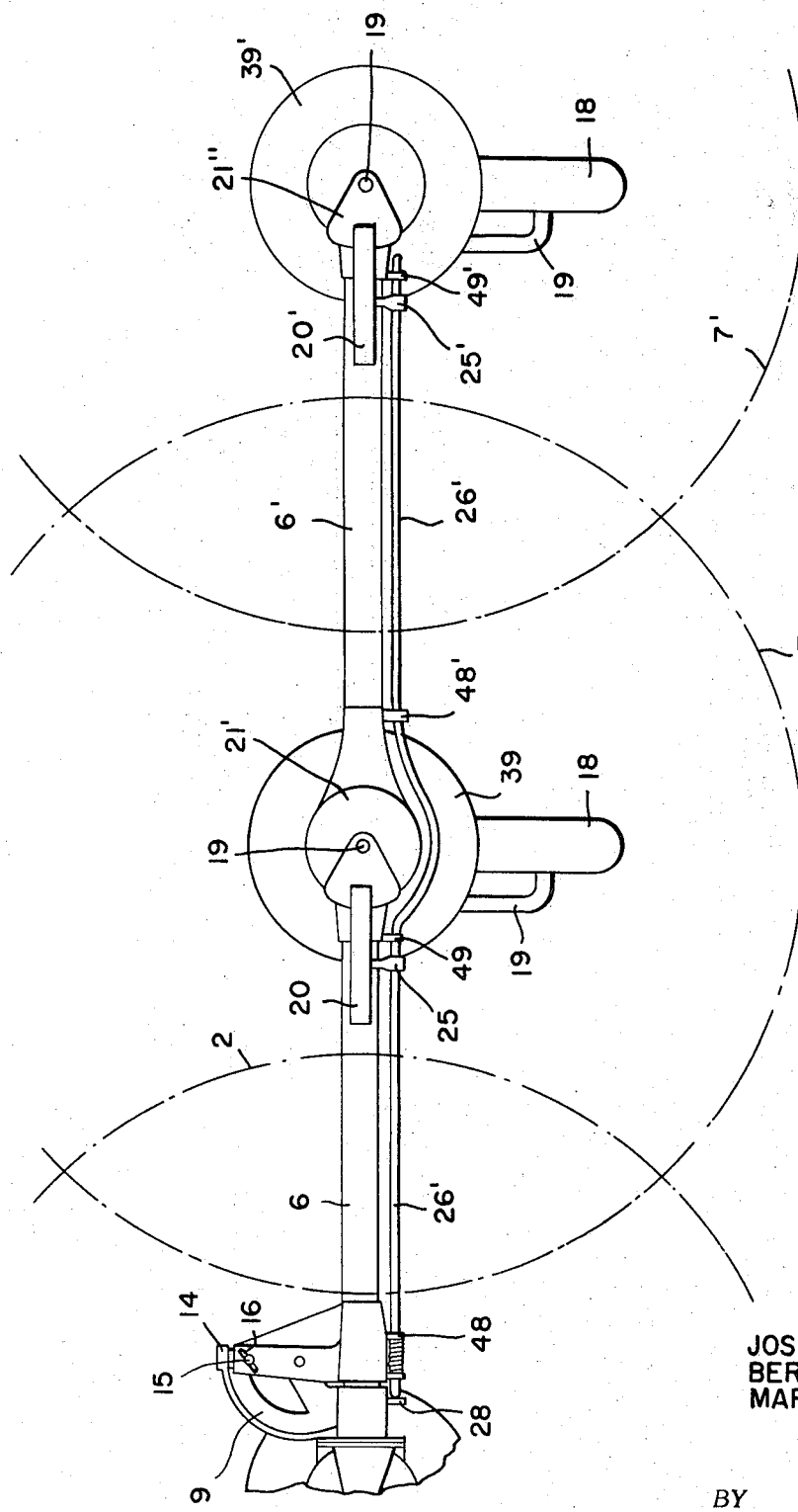

3,552,773
ROTARY-RAKE HAYMAKING MACHINE WITH PIVOTAL ARMS
Josef Purrer, Berthold Binder, and Martin Maier, Gottmadingen, Germany, assignors to Maschinenfabrik Fahr AG, Gottmadingen, Germany, a corporation of Germany
Filed May 14, 1969, Ser. No. 824,404
Claims priority, application Germany, May 16, 1968, 1,757,499
Int. Cl. B62d 53/00
U.S. Cl. 280—413                10 Claims

ABSTRACT OF THE DISCLOSURE

A haymaking machine (e.g. a rake or tedder) has two rotary rakes mounted on opposite ends of a support beam extending transverse to the direction of travel with a wheel parallel to that direction under each rake. Each beam end carries an arm with a further rake pivotal through 90° or more from a work position aligned with the beam to a transport position extending along behind the beam thereto. Each wheel of each outer rake can be arrested to lie generally transverse to the arm by a lock mechanism. When the arm is freed at the pivot and starts to swing toward the rear, a force-transmitting member engageable with the beam is automatically actuated and frees the wheel lock mechanism thereby allowing for free swiveling of the outer wheel.

---

The present invention relates to a drawn farm implement and, more particularly, to a rotary-rake haymaking machine designed to rake crop material into windrows, shift crop material from place to place, or perform a tedding operation.

In the commonly assigned copending application Ser. No. 647,069 filed June 19, 1967 by Josef Pürrer and Martin Maier and entitled "Haymaking Machine," now Patent No. 3,475,890 there is disclosed a haymaking machine of the general character described having a pair of rotary rakes horizontally spaced upon a support beam and driven by respective bevel-gear assemblies in the rake heads on the beam and a pair of support wheels whose shafts extend through each of the rake heads and thereabove are provided with levers connected by a pivotal link rod which forms a parallelogrammatic linkage with the levers and the support beam. One of the levers is a bellcrank lever whose arm forms a handle for swinging the beam into a position oblique to the direction of advance of the machine from a position perpendicular to this direction and has a locking pawl for setting the positions of the beam with respect to the wheels. Such a system allows the effective width of the machine to be greatly reduced for transport.

In order to use a greater number of individual rotary rakes on a single machine, it has been found to be desirable to pivoting the outer arms carrying additional rakes upwardly or rearwardly for transport. The commonly assigned copending application Ser. No. 647,065 filed June 19, 1967 by Josef Pürrer and entitled "Pivot Assembly for Haymaking Machines and the Like" describes a pivot assembly for the inwardly swingable outrigger beam of a rotary-rake haymaking implement having a pair of hollow beam sections relatively swingable to include an angle of 90° between them in one (retracted) position thereof and axially aligned in another (extended) position thereof. A shaft extends through the beam sections and is axially subdivided into a pair of interconnectable shaft sections disengaged from one another in the retracted position and mutually interconnected in the extended position of the beam sections. A ball joint interconnects the beam sections for relative pivotal movement thereof between these positions about a vertical axis laterally offset from the shaft in the retracted position and perpendicular to the axis thereof and a horizontal axis generally parallel to one of the sections, the axes intersecting one another.

In addition, the commonly assigned copending application Ser. No. 729,045 filed May 14, 1968 by Josef Pürrer and Berthold Binder and entitled "Agricultural Implement," now Pat. No. 3,496,712 sets forth an implement to be towed by a tractor having two inner rotary rakes riding on fixedly oriented wheels at the ends of a central beam section and two outer rakes riding on swivelable wheels on the free ends of articulated extensions of the central beam section. Respective locking pawls immobilize the axles of the outer wheels to make these wheels rotate about a common axis with the inner wheels, forwardly of the beam, in a working (extended) position in which the extensions are aligned with the central section; in a traveling (retracted) position, in which the extensions are swung back, the pawls are released so that the outer wheels can swing into the planes of the respective inner wheels as the outer rakes trail behind the inner rakes.

A combination of the last two above-described systems may include a rotary-rake haymaking machine which has, in a work position, at least four rakes riding on wheels one next to the other in line transverse to their direction of travel. In a transport position, all the rakes but the center two are pivoted behind these two and the wheels are freed and castered, or are locked in new angular positions relative to their respective beam sections to ride behind the front rakes.

In such a system, the operator must manually free each pivot and each swivelable wheel when changing from the work to the transport position. Often he must also displace the heavy rake arms or extensions by hand. Thus, to move from the transport to the work position, the rakes must be dragged around until they assume just the right positions, then the pivots locked and pawls turned on the wheels to set them. This latter operation is often extremely difficult for even the most powerful operators. In any case, a great deal of effort and time is usually wasted prior to the start of the mowing, or afterwards.

It is, therefore, the general object of the present invention to provide an improved farm implement of the above-described type which will extend some of the principles originally set forth in the above-identified applications.

More specifically, it is an object of the present invention to provide a rotary-rake haymaking machine which can be easily and swiftly converted from its transport to its working position, and vice versa.

Another object is to provide simple, inexpensive and foolproof means for readying the implement for transport and work, and vice versa.

The above objects are attained, in accordance with the principal features of the present invention, with a rotary-rake machine having a pair of pivot assemblies and lock means connecting outrigger arms to a central beam as described in the above-cited application Ser. No. 647,065. The outrigger wheels swivel as described in application Ser. No. 729,045 but are here lockable in the work position, substantially parallel to the central wheels, by a spring-loaded bolt engageable in a bore in the head of the respective axle. According to an essential feature of the present invention this lock means for the outer wheel is coupled with the support such that when the arm swings out of its working position, the bolt is automatically pulled and the outer wheel freed.

According to another feature of the present invention, the axle head is provided with camming surfaces which depress the bolt and, when the arm is in the working position but the wheel is not, allow the bolt to automatically engage in the hole then the wheel moves into this position.

This coupling is embodied in a rod or other nonextendable elongated member which is urged by a spring toward the central support beam and engages an abutment thereon in the working position. When the arm moves out of this working or extended position, the abutment pivots away from the rod, is then moved inward by its spring, and pulls the bolt out of the axle head.

The above objects, features and advantages will become more apparent from the following description, reference being made to the accompanying diagrammatic drawing, in which:

FIG. 1 is a top view of the implement according to the present invention, in the working position;

FIG. 1a is a side view taken in the direction of arrow Ia of FIG. 1;

FIG. 2 is a top view of part of a slightly different implement, in the working position;

FIG. 2a is a sectional detail view of the pivot of FIG. 2 in enlarged scale;

FIG. 3 is a top view of the implement shown in FIG. 2, but here in the transport position;

FIG. 3a is a sectional detail view of the pivot as shown in FIG. 3 in enlarged scale;

FIG. 4 is an upright partly sectional view of the rake head shown in FIG. 2;

FIG. 5 is a detail sectional view similar to that of FIG. 4, but here showing the bolt in the transport, unengaged position; and FIG. 6 is a top view of another form of the present invention.

As shown in FIGS. 1 and 1a, a rotary rake has a transmission 1 attached via a coupling 42 to the power take-off of a tractor 40 and is drawn in the direction of arrow X by this tractor with its towing bar 43. To each side of the transmission are hollow beam sections 3 which are supported on wheels 17 that are fixed thereto to always lie at right angles to the sections 3. Two rotary rakes shown by circles 2 each rotate about the wheels 17.

To one side of the transmission 1 is an outrigger arm 4 bearing a rake whose orbit is indicated at 5 and to the other side is a beam section or arm 6 bearing a rake 7. As shown in more detail in FIG. 1a, this rake 7 consists of four arms 7a angularly spaced about a driven head 39 and each bearing a respective tine 7b, attached as described in the commonly assigned copending application Ser. No. 715,649 filed Mar. 25, 1968 by Josef Pürrer and entitled "Rake Construction for Haymaking Machines."

FIGS. 2, 2a, 3 and 3a show a system similar to that of FIGS. 1 and 1a except that here, instead of the transmission 1, a relatively heavy housing 1' contains an engine for driving the assembly. The outrigger arm 6 is substantially identical to the arm 4 so that only the former need be described.

The arm 6 is pivotal through an arc of around 90° about a pin 12 fixed in the web of a segment 9 formed on the end and in back of the beam 3. A bolt 14 is slidably received in a flange portion 11 of the beam section 6 and is engageable in bores 35 and 36 in the segment 9. A spring 37 urges this bolt away from the pivot pin 12 and a lever 15 projects laterally from this bolt through a curved slot 16 in the flange 11.

The section 6 is hollow and houses a shaft section 33 having a pin 34 passing transversely through its end and projecting on both sides. The beam section 3 has a shaft 30 fitted on its end with a socket 31 having a notch 32 receiving the shaft 33 and pin 34. This entire pivot arrangement is described in greater detail in the above-cited application Ser. No. 647,065.

The rake 7 rides on a wheel 18 which is mounted on a bent axle 19 (see FIG. 1a) journaled in an end portion 21 of the beam 6. As also shown in FIGS. 4 and 5, the rake head 39 is rotatable about the axle 19 and unitarily attached to a coaxial bevel gear 45 which meshes with another bevel gear 46 on the end of the shaft 33. In this manner rotation of the shaft 30, in the FIG. 2 position, is transmitted via the pin 34 to the shaft 33 and then through the bevel gears 46 and 45 to the rake head 39 to spin this in the direction desired for tedding or windrowing. A complete discussion of the princples of how such a rotary rake is used for haymaking is set forth in the commonly assigned application Ser. No. 577,335 filed Sept. 6, 1966 by Michael Stampfer and entitled "Haymaking Machine and Method of Operating Same," now Patent No. 3,509,707.

The upper end of the axle 19 is fixed in a body in the form of a handle 20 by means of a pin 47 such that rotation of the handle will rotate the wheel 18 with the handle always lying perpendicular to the plane of the wheel. A pin or bolt 23 riding in a bore 50 in the end portion 21 is engageable in a bore 22 in the handle 20 as shown in FIG. 4 and can be cammingly pushed back toward the rake 2 by camming surfaces 29 formed on this handle 20. Both bores 22 and 50 extends radially to the axle shaft 19 and horizontally parallel to the arm 6. A rod 26 is slidable in two guide ears 48 and 49 on the arm 6 and is urged toward the center of the mower by a prestressed spring 27 held captive under precompression against the one bar 48 and a disk 41 rigidly attached to the rod 26. The inside end of the rod 26 engages an abutment tab 28 on the beam section 3 in the extended or working position and the outer end rigidly carries a lug 25 which slidably receives the end of the bolt 23. A prestressed spring 24 (held captive under precompression between this lug 25 and a shoulder 52 of the bolt 23) urges the bolt outwardly until a pin 53 on the bolt engages the inward surface of the lug 25.

The rake is generally stored and transported in the position shown partly in FIG. 3, with the arms 6 and 4 swung back behind the sections 3 and the wheels 18 castering. Upon arrival at the field to be worked, the handle 20 (when in the position of FIG. 5) is turned counterclockwise to set the wheel generally in the direction shown by arrow Y and the lever 15 is set by being frictionally retained in curved slot 16 substantially as described in the above-mentioned application Ser. No. 647,065 to disengage the bolt 14 from the bore 36. The wheel 18 and lever 15 are similarly set for the other rake 5. Then the tractor 40 is backed up for a short distance. This causes the arm 6 to swing into the position shown in FIG. 2, whereupon the bolt 14 automatically engages in the bore 35. At the same time the rod 26 engages the abutment 28 and moves to the right (as seen in FIG. 2 also) thereby causing the bolt 23 to also slide this way. As the mower continues to back, the wheel 18 swivels around thereby causing the bolt 23 to be engaged by the camming surfaces 29 and depressed against the force of the spring 24. The moment that the wheel 18 assumes the FIG. 2 position and the bolt 23 falls in line with the bore 22, this spring 24 forces the bolt into the bore and locks the wheel in place, substantially in line with and parallel to the wheels 17. At this time raking may be commenced in the known manner. All wheels 17 and 18 should be fixed parallel to each other so that the machine is guided in a straight line.

On termination of the raking, the operator need only actuate the bolts 14 again to free them from the bores 35. Then as he starts to drive the tractor 40 onward, in the forward direction this time, the arms 4 and 6 start to swing back. Each rod 26 thereby leaves contact with the abutment 28 and is moved by the spring 27 toward the center. This sliding of the rods 26 retracts the bolts 23 from the bores 22 thereby allowing the wheels 18 to swivel freely. Thus, the arms 4 and 6 will fold back with the wheels 18 castering until the pins 14 automatically engage in the bores 36 and fix the arms.

The present invention is not limited to haying machines with four rakes. FIG. 6 shows part of a haying machine identical with that of FIG. 1, except that here a further rake 7' with its own wheel 18', axle 19', head 39, end portion 21", lever 20', and guide 49' is mounted on an extension 6' of the arm 6 outboard of the rake 7. An altered rod 26' is guided around an altered end portion 21' of the rake 7 and through a further guide 48' and carries another lug 25' engaging a further bolt (not shown). The drive for this rake 7' is carried out through bevel gears as shown in several of the above-mentioned applications. Here the single rod 26' can free several bolts, but the principle is basically the same. The advantage is that a haying machine with a greater effective width is attained with all the advantages of the before-described embodiment, since here both rakes 7 and 7' will trail behind the rake 2.

What is claimed is:
1. A drawn farm implement comprising:
   a support displaceable in a horizontal direction;
   at least one arm mounted on said support;
   pivot means for swingably mounting said arm on said support, said arm being displaceable between an extended position lying transverse to said direction and a retracted position generally in said direction;
   first lock means at said pivot means for releasably retaining said arm in said extended position;
   a wheel mounted on said arm and swivelable about a vertical axis;
   second lock means on said arm for releasably locking said wheel against swiveling about said vertical axis; and
   means responsive to release of said first lock means and operatively connected to said second lock means for releasing said second lock means and freeing said wheel to permit said arm to swing from said extended position to said retracted position upon advance of said support.
2. The implement defined in claim 1 wherein said arm carries another such wheel and another such second lock means, said means responsive to release of said first lock means being operatively connected to both said second lock means.
3. The implement defined in claim 1 wherein said means responsive to release of said first lock means includes a nonextendable member engageable with said support and extending, in said extended position, between said support and said second lock means and shiftable upon incipient movement of said arm out of said extended position to release said second lock means.
4. The implement defined in claim 3, further comprising an axle for said wheel extending at least partially along said vertical axis, said second lock means including a body on said axle rotationally fixed thereto and a bolt on said arm engageable with said body in one angular position thereof to arrest said axle, said member being coupled with said bolt.
5. The implement defined in claim 4 wherein said means responsive to release of said first lock means includes a prestressed spring yieldably urging said member into engagement with said support in said extended position.
6. The implement defined in claim 5, wherein said means responsive to release of said first lock means includes another prestressed spring yieldably urging said bolt into engagement with said body.
7. The implement defined in claim 6 wherein said arm has an end portion formed with a bore slidably receiving said bore, said body also being formed with a similar bore, said bores extending in line with each other in said one angular position of said body and said extended position of said arm.
8. The implement defined in claim 7 wherein said member is a rod coupled to said bolt.
9. The implement defined in claim 7 wherein said body is formed with at least one camming surface cammingly engageable with said bolt.
10. The implement defined in claim 7 wherein said support is elongated and extends transversely to said direction, said arm being mounted on one end of said support and another such arm being mounted on the other arm thereof, said other arm also being provided with a wheel, first and second lock means, pivot means and means responsive to release of its respective second lock means.

References Cited

UNITED STATES PATENTS

| | | | |
|---|---|---|---|
| 3,008,732 | 11/1961 | Raney | 280—412 |
| 3,414,064 | 12/1968 | Foster | 280—413X |
| 3,475,890 | 11/1969 | Purrer et al. | 56—370 |

LEO FRIAGLIA, Primary Examiner

U.S. Cl. X.R.
56—370; 172—311